United States Patent Office 3,032,403
Patented May 1, 1962

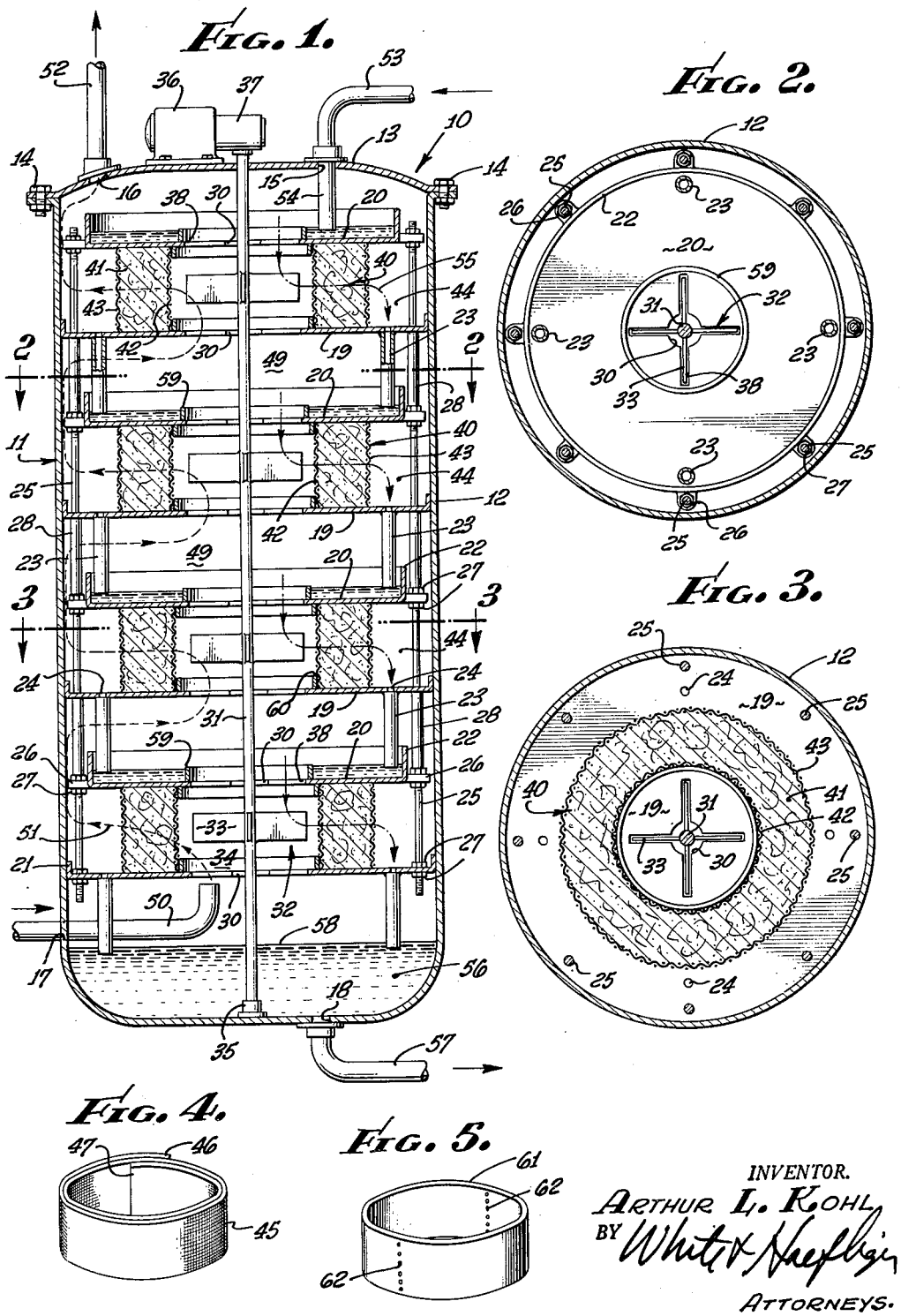

3,032,403
LIQUID-LIQUID CONTACTING APPARATUS
Arthur L. Kohl, 9910 Mollyknoll Drive, Whittier, Calif.
Filed Mar. 23, 1959, Ser. No. 801,337
6 Claims. (Cl. 23—270.5)

This invention relates to apparatus for contacting and separating liquids of different densities and more particularly has to do with a novel construction of such apparatus which in operation is highly efficient.

Speaking generally with respect to the design of equipment for process contacting and separating liquids of different densities, known apparatus of this sort generally includes a mixing chamber wherein different density liquids are agitated and from which they flow into a settling chamber for separation and removal. Certain disadvantages of such known equipment include limitation of flow capacity imposed by the low rate of phase separation and excessive mechanical complexity particularly when more than one contacting and separating stage is required.

The present apparatus constitutes a solution to these problems, and in addition provides very high efficiency of operation, as for example, in the case of operation as a solute extractor characterized by solute transfer between contacted liquids of different densities. Generally speaking the invention embodies a vertical assembly of mixing and settling zones through which liquid phases of different densities flow counter-currently into the mixing zones and in concurrent relation to the settling zones, from which the lighter and heavier liquids flow into other mixing and settling zones at different elevations.

More particularly the invention contemplates apparatus comprising a shell containing mixing and settling zones at each of several different elevations, the shell having upper and lower ports for passing different liquids upwardly and downwardly through the shell and said zones, and impellers axially rotatable in the mixing zones, which have inlets at axially opposite sides of the impeller through which different density liquids are drawn counter-currently into the mixing zones for impeller induced intimate mixing therein and concurrent discharge flow to the settling zones. The latter have upper and lower outlets in communication with the inlets of different mixing zones for circulating separated lighter and heavier liquids from the settling zones to other mixing zone stages. The invention is particularly characterized in that flow restrictive means are located in the paths of liquid flow from the mixing to the settling zones, these being operable to restrict substantially the flow therebetween for promoting liquid separation in the settling zones. Such flow restrictive means, which may typically comprise a vertical cylindrical shell section of plastic mesh, wire screen or perforated sheet surrounding the mixing zones, also act to coalesce the separated particles of the discontinuous liquid phase of such particles flow to the settling zone.

As will be brought out, the mixing zones are preferably located centrally of the shell and are vertically spaced therein, with the settling zones extending annularly about the mixing zones, and the impellers are axially vertically rotatable in the latter by a central shaft which projects vertically within the shell. The mixing and settling zone stages are preferably formed by vertically spaced horizontally extending panels above and below the flow restrictive means, these panels also forming circulation zones intermediate vertically successive mixing and settling zone stages. Such circulation zones pass the lighter and heavier liquids circulating from the settling zone outlets to the mixing inlets, all as will be described. The panels forming the mixing, settling and circulation zones are desirably interconnected by vertical tie rods to form an assembly which is received downwardly in the shell, the latter having a top closure which is removable to allow insertion and withdrawal of the panel assembly. Also, the mixing zone inlets are desirably formed by the panels which include central openings through which the impeller shaft extends, as well as slots extending away from the openings through which the impeller vanes may be withdrawn by the shaft, relative to the panels. Thus, the shaft and impellers may be removed from the shell independently of the panel assembly, which itself may be withdrawn whenever desired.

These and other objects and advantages of the invention, as well as the details of an illustrative embodiment, will be more fully understood from the following detailed description of the drawings, in which:

FIG. 1 is a vertical section taken through the apparatus;
FIG. 2 is a section taken on line 2—2 of FIG. 1;
FIG. 3 is a view taken on line 3—3 of FIG. 1;
FIG. 4 shows alternate flow restricting means; and
FIG. 5 shows another alternate flow restricting means.

In the drawings, the apparatus generally indicated at 10 includes a shell 11 in the form of a vertically elongated receptacle 12, having a top closure 13 bolted at 14 to the receptacle. The closure has inlet and outlet ports 15 and 16 respectively, and the cylindrical receptacle has inlet and outlet ports 17 and 18 near the bottom thereof, for flowing different density liquids in concurrent relation through the shell.

Contained within the shell are a vertical series of panels or decks 19 and 20 which extend generally horizontally. Panels 19 extend completely crosswise of the receptacle interior and are flanged at 21 for loose reception adjacent the interior wall of the receptacle. Panels 20, on the other hand, are in the form of trays which are peripherally flanged at 22 to retain liquid draining through outlets 24 in panels 19 and through the downcomer conduits 23 attached to the undersides of panels 19.

Circularly spaced tie rods 25 extend vertically downwardly through the panels 19 inwardly of flanges 21 and through ears 26 on the tray panels 20 extending radially outwardly of flanges 22. The tie rods are suitably attached to the ears 26 by nut clamps 27, and cylindrical spacers 28 received on the tie rods hold the panels 19 at appropriate intervals between pairs of panels 20, with the exception that the bottom panel 19 is connected to the tie rods by nut clamps 27. The means for connecting the tie rods to the panels may take different forms, and the spacers and clamps described are merely illustrative of representative means.

All of the panels contain central inlet openings 30 which are vertically aligned, and are larger than a vertical shaft 31 which projects downwardly therethrough. The shaft mounts impellers extending radially from the shaft in vertical planes and within mixing sub-compartments or zones 34 formed by pairs of panels 19 and 20, as illustrated. The shaft 31 is bottom supported by a suitable bearing 35 and may be driven at any desired speed through transmission 37 by a variable speed motor 36 mounted on the top closure 13.

All of the panels also contain slots 38 which extend radially outwardly from the openings 30 to an extent at least as great as the radial dimensions of the vanes 33 of impellers 32 as best illustrated in FIG. 2. Thus, the slots are sized to pass the vanes, enabling complete withdrawal of the shaft 31 and impellers from the panel assembly, as the closure 13 is removed upwardly and away from the receptacle 12. After such removal, the panel asembly itself may be upwardly wihdrawn from the receptacle for repair or inspection, as desired.

Extending about each mixing zone is an annulus of foraminate material generally indicated at 40. As shown in FIG. 1, such material may comprise a mesh, as for example a thick plastic wire mesh 41 retained between inner and outer screens 42 and 43, the screens and mesh extending vertically between the panels 19 and 20. As will be described, the annular mesh acts to restrict radially outward concurrent flow of mixed liquids to promote separation thereof in settling sub-compartments or zones 44, extending annularly about the mesh inwardly of the shell interior wall and between lower and upper panels 19 and 20 respectively. An alternate form of flow restrictive means are shown in FIG. 4 to comprise a convolute roll of wire screen 45, the opposite roll ends being illustrated at 46 and 47. FIG. 5 shows another flow restricting means comprising a cylindrical sheet 61 having flow restricting openings 62. Sheet 61 is to be positioned so that openings 62 are remote from openings 24, requiring that the heavier liquid flowing through openings 62 travel a maximum distance in each settling zone.

Settling zones 44 not only have lower outlets 24 as described, but also have upper annular outlets 48 formed between the tray flanges 22 and the inner wall of the shell or receptacle 12. The latter outlets communicate with circulation zones 49 formed by and between the upper and lower panels 19 and 20 respectively, directly above the trays 20.

In operation, a lighter density liquid is supplied to the apparatus through a conduit such as that shown at 50 entering the shell through port 17 below the lowermost panel 19, the path of the lighter density liquid being shown by the broken line 51. Such liquid leaves the shell through the upper port 16 in the closure 13 and through a discharge conduit 52. The heavier liquid typically enters the shell from a conduit 53 through port 15 in the closure 13 and through a downcomer conduit 54 discharging into the uppermost tray 20. The path of the heavier density liquid in coursing downwardly through the shell is indicated by the broken line 55, a body of the heavier density liquid collecting in the bottom of the receptacle being indicated at 56 directly above the outlet port 18 communicating with the discharge conduit 57. The top surface level 58 of the liquid body 56 constitutes a primary interface between the heavier and lighter density liquids, other interfaces of the separated liquids being formed by the top surface levels of heavier density liquid collecting on each tray 20. The levels are maintained by a weir 59 over which the heavier liquid flows before entering the next lower stage. The weir 59 holds liquid on tray 20 at a sufficient depth to seal the bottom of the downcomer 23, so that lighter liquid cannot pass up through the downcomer and by-pass a stage.

As shown by the broken lines 51 and 55, the lighter and heavier density liquids flow in countercurrent relation in entering each mixing zone through the lower and upper inlets defined by the openings 30 and slots 38. Such countercurrent flow is induced by rotation of the impellers 32 in the mixing zones, the impellers also acting to promote intimate mixing of the different density liquids drawn into the mixing zones. From such zones the mixed liquids discharge concurrently through the foraminate material 41 acting to restrict such flow and to promote coalescing of discrete particles of liquid of the same density, all for the purpose of promoting rapid separation of the different density liquids in the settling zones 44, into which the liquid flows from the mesh annuli. An annular dam 60 prevents the heavier liquid which flows down the foraminate material 41 and settles to the bottom of the settling zone 44 from flowing back into the mixing zone. This dam also serves to retain the foraminate material in the proper location. The gravity separated liquids in the settling zones 44 are respectively drawn upwardly and downwardly, according to their lighter and heavier density, through outlets 48 and 24. Upwardly discharging lighter liquid then flows through the circulation compartments or zones 49 for upward induction into the next above mixing zone or stage, whereas the heavier liquid flows downwardly into the conduit 23 into the next below tray 20 for downward induction into the next below mixing zone or stage.

As previously brought out, the vertical staging of the mixing and settling zones, and the use of a flow restrictive means between the mixing and settling zones of each stage, promotes very high contacting and separating efficiency, in terms of volume flow through a given size contacting apparatus, as for example where the apparatus is used to transfer solute between solutions of different density flowing through the apparatus.

For illustrative purposes the figures and discussion are based on the less dense liquid being the continuous phase. The invention can also be applied with the heavier liquid continuous and the lighter liquid in discontinuous phases in which case the internal structures would be in an inverted position relative to that shown in the figures.

I claim:
1. Apparatus for process contacting and separating liquids of different densities, comprising a shell and panel assembly forming vertically stacked and alternating first and second type compartments, said first type compartments including mixing and settling sub-compartments and said second type compartments being open to freely circulate lighter density liquid flow, the mixing and settling sub-compartments of each first type compartment being spaced horizontally and said settling sub-compartment extending annularly about said mixing sub-compartment, said shell having upper and lower ports for passing different density liquids upwardly and downwardly through the shell and said compartments, a central shaft and impellers axially vertically rotatable in said mixing sub-compartments by said shaft, said mixing sub-compartments having upper and lower inlets at axially opposite sides of said impellers through which different density liquids are adapted to be drawn counter-currently from said circulation compartments into said mixing sub-compartments for impeller induced intimate mixing therein and concurrent discharge flow to said settling sub-compartments, said settling sub-compartments having upper and lower outlets in communication through said circulation compartments with the inlets of different mixing sub-compartments and through which separated lighter and heavier liquids are flowable from said settling sub-compartments to said mixing sub-compartments, conduit means extending generally vertically across the path of lighter density liquid flow in said circulation compartments for conducting heavier density liquid from said lower outlets out of contact with said lighter density liquid flow and for discharging said heavier density liquid, said panels including tray structure proximate the lower terminals of said conduit means for receiving said heavier density liquid discharge in pools separate from said lighter density liquid flow and directly accessible to the inlets of lower level mixing sub-compartments, said tray structure including weir means for retaining said pools in sealing contact with said terminals of the conduits, and foraminate means between said mixing and settling sub-compartments in the path of said concurrent flow and operable to restrict substantially the flow from said mixing to said settling sub-compartments thereby promoting liquid separation in said settling sub-compartments.

2. The invention as defined in claim 1 in which said mixing sub-compartment inlets are formed by said panels which include central openings through which said shaft extends and slots extending away from said openings through which the impeller vanes may be withdrawn by axial displacement of said shaft relative to the panels.

3. The invention as defined in claim 1 in which said foraminate means comprises an annular mesh.

4. The invention as defined in claim 1 in which said foraminate means comprises an annular perforated sheet.

5. Apparatus for process contacting and separating liquids of different densities, comprising a shell and panel assembly forming vertically stacked and alternating first and second type compartments, said first type compartments including mixing and settling sub-compartments and said second type compartments being open to freely circulate lighter density liquid flow, the mixing and settling sub-compartments of each first type compartment being spaced horizontally and said settling sub-compartment extending annularly about said mixing sub-compartment, said shell having upper and lower ports for passing different density liquids upwardly and downwardly through the shell and said compartments, a central shaft and impellers axially vertically rotatable in said mixing subcompartments by said shaft, said mixing sub-compartments having upper and lower inlets at axially opposite sides of said impellers through which different density liquids are adapted to be drawn counter-currently from said circulation compartments into said mixing sub-compartments for impeller induced intimate mixing therein and concurrent discharge flow to said settling sub-compartments, said settling sub-compartments having upper and lower outlets in communication through said circulation compartments with the inlets of different mixing sub-compartments and through which separated lighter and heavier liquids are flowable from said settling sub-compartments to said mixing sub-compartments, conduit means extending generally vertically across the path of lighter density liquid flow in said circulation compartments for conducting heavier density liquid from said lower outlets out of contact with said lighter density liquid flow and for discharging said heavier density liquid, said panels including tray structure proximate the lower terminals of said conduit means for receiving said heavier density liquid discharge in pools separate from said lighter density liquid flow and directly accessible to the inlets of lower level mixing sub-compartments, said tray structure including weir means for retaining said pools in sealing contact with said terminals of the conduits, and foraminate means between said mixing and settling sub-compartments in the path of said concurrent flow and operable to restrict substantially the flow from said mixing to said settling sub-compartments thereby promoting liquid separation in said settling sub-compartments, said assembly including vertically spaced horizontally extending panels supporting said foraminate means, vertically extending tie rods interconnecting said panels in an assembly removably received downwardly in said shell, said shell comprising a vertically elongated receptacle and a top closure for the receptacle through which said shaft projects, said tie rods being spaced about said shaft, said panels forming said mixing sub-compartment inlets and containing slots extending away from said inlets through which said impellers may be withdrawn by said shaft, said foraminate means comprising an annular mesh.

6. Apparatus for process contacting and separating liquids of different densities comprising a shell and panel assembly forming vertically stacked and alternating first and second type compartments, said first type compartments including mixing and settling sub-compartments and said second type compartments being open to freely circulate heavier density liquid flow, the mixing and settling sub-compartments of each first type compartment being spaced horizontally, impellers axially vertically rotatable in said mixing sub-compartments, said mixing sub-compartments having upper and lower inlets at axially opposite sides of said impellers through which different density liquids are adapted to be delivered countercurrently from said circulation compartments into said mixing sub-compartments for impeller induced intimate mixing therein and concurrent discharge flow to said settling sub-compartments in which the different density liquids tend to separate, said settling sub-compartments having upper and lower outlets in communication through said circulation compartments with the inlets of different mixing sub-compartments and through which separated lighter and heavier liquids are flowable from said settling sub-compartments to said mixing sub-compartments, conduit means extending generally vertically across the path of heavier density liquid flow in said circulation compartments for conducting lighter density liquid from said upper outlets out of contact with said heavier density liquid flow and for discharging said lighter density liquid, said panels including tray structure proximate the terminals of said conduit means for receiving said lighter density liquid discharge in pools separate from said heavier density liquid flow, said tray structure including weir means for retaining said pools in sealing contact with said terminals of the conduits, and foraminate means between said mixing and settling sub-compartments in the path of said concurrent flow and operable to restrict substantially the flow from said mixing to said settling sub-compartments thereby promoting liquid separation in said settling sub-compartments.

References Cited in the file of this patent

UNITED STATES PATENTS

| | | |
|---|---|---|
| 2,665,196 | Poffenberger | Jan. 5, 1954 |
| 2,699,225 | Dalhbeck | Jan. 11, 1955 |
| 2,850,362 | Scheibel | Sept. 2, 1958 |